A. H. MEILICKE.
CORN BINDER ATTACHMENT.
APPLICATION FILED APR. 4, 1919.

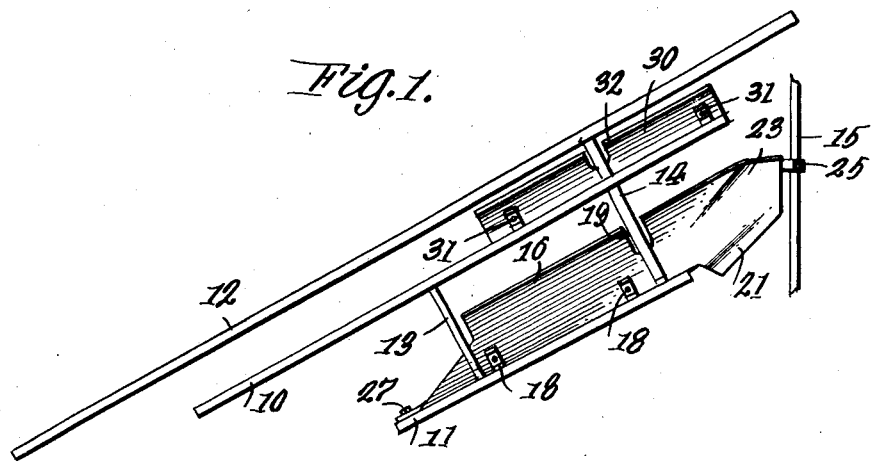
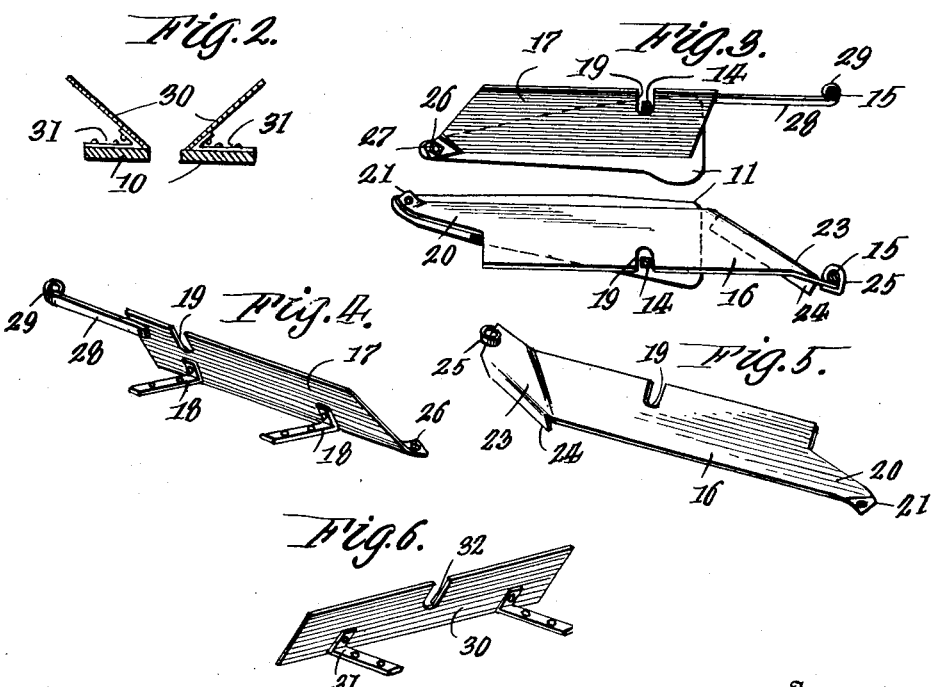

1,342,640.

Patented June 8, 1920.
2 SHEETS—SHEET 2.

WITNESSES

ADOLPHE H. MEILICKE INVENTOR.

BY

ATTORNEY.

UNITED STATES PATENT OFFICE.

ADOLPH H. MEILICKE, OF BARING, MISSOURI.

CORN-BINDER ATTACHMENT.

1,342,640.   Specification of Letters Patent.   Patented June 8, 1920.

Application filed April 4, 1919. Serial No. 287,392.

*To all whom it may concern:*

Be it known that I, ADOLPH H. MEILICKE, a citizen of the United States, residing at Baring, in the county of Knox and State of Missouri, have invented certain new and useful Improvements in Corn-Binder Attachments, of which the following is a specification.

This invention is a corn binder attachment and has for its principal object the production of a device which may be attached to the well known corn binder of the McCormick type to catch the ears of corn which are accidentally broken or dislodged from the corn stalks when the same are moved to a position where the same are bound into bundles, the attachment being so arranged that the movement of the stalks will further direct the ears of corn caught thereby to positions where the same may finally be displaced and easily collected.

Another object of this invention is the production of a corn binder attachment wherein a plurality of troughs are provided to be inserted in a McCormick corn binder adjacent the endless conveyer thereof, whereby after the corn stalks have been severed and are moved into position where the same will be bound into bundles and finally displaced during which movement the ears of corn are often broken therefrom, the ears of corn will also be directed to places where the same may be easily gathered.

A still further object of this invention is the production of a corn binder attachment wherein the troughs which catch the falling ears of corn are contiguous to each other and slant to efficiently catch such ears and allow the same to be moved therealong while efficient means are provided for reinforcing the troughs and holding the same against accidental displacement.

One practical form of construction and assembly of the present invention will be hereinafter described and is illustrated in the drawings, in which:—

Figure 1 is a side elevation of the attachment, portions of a supporting structure being shown in fragmentary elevation.

Fig. 2 is a transverse sectional view through one of the troughs.

Fig. 3 is a view of the lower trough member.

Fig. 4 is a detail perspective view of the exterior of the auxiliary section of the lower trough member.

Fig. 5 is a detail perspective view of the inner portion of the primary section of the lower trough member.

Fig. 6 is a detail perspective view of one of the members of the upper trough.

Figure 7:
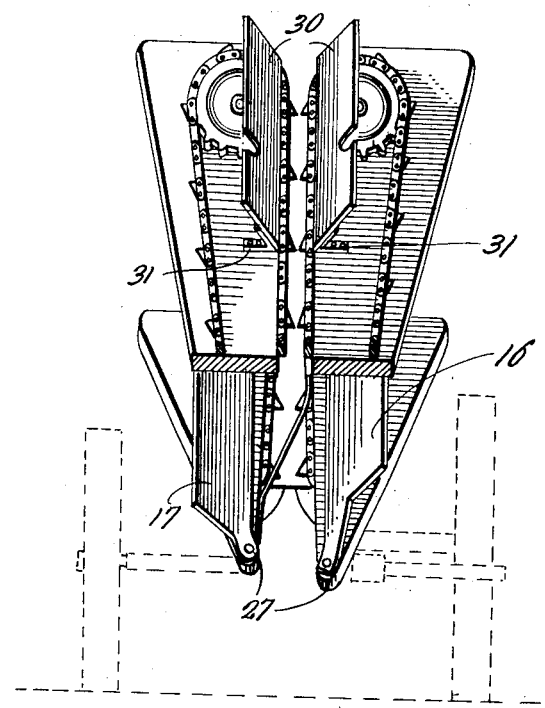
Fig. 7 is a transverse section taken through the several pairs of gathering boards and showing the attachments in place thereon.

In the preferred embodiment of the present invention about to be specifically described, 10 and 11 indicate the gathering boards of a McCormick corn binder not being deemed necessary to be illustrated upon which endless conveyers are supported. Upon the member 10 is carried the member 12 for supporting an upper trough or other conveying means of the corn binder, it being noted that the members 10, 11 and 12 are spaced apart by standards 13 and 14 while a vertically extending column 15 is also provided adjacent the rear ends of the members 10, 11 and 12 as shown in Fig. 1. The foregoing structure is merely of a conventional type as it is not thought necessary to include a corn binder, in view of the fact that the present invention relates specifically to an attachment therefor and may be employed upon any form of corn binder.

It should be understood that in use of corn binders after the stalks have been severed and are moving upwardly into a place where they will engage the usual binding attachment where a number of stalks are bound into a bundle the movement is often so violent as to frequently cause numerous ears of corn to be broken from the stalks and dropped where they will be injured or at least will require considerable effort to be collected, when a comparatively large corn field is being covered by the device. The primary section 16 of the lower trough member is longer than the auxiliary section 17 thereof as shown in Fig. 3. It should be noted that these sections 16 and 17 are formed preferably of sheet material which is sufficiently heavy to stand the strain imparted thereto. These sections 16 and 17 have angular strap iron or other suitable material 18 fixed thereto and also secured to the members 11, whereby the sections 16 and 17 will be held in tilted positions and will be at substantially right angles to each other to form a trough like member although there is sufficient space between the lower portions of the sections 16 and 17 to permit the movement of stalks therebetween. The sections 16 and 17 are also provided with notches 19 intermediate their ends communicating with their upper edges, thus allowing the standards 14 to pass therethrough without interference although it will be noted that the standards by passing through these notches will positively prevent displacement of the sections when considerable strain is imparted thereto.

The primary section 16 is provided with an elongated finger 20 having a tip 21 thereon bent at an angle thereto to rest easily upon one of the supporting members 11 to which it is permanently secured as indicated at 22. The rear portion of the auxiliary section 16 is bent around at the inner end to form an angular projection 23 terminating in an angular flange 24. A clamp 25 is fixed upon the end of the projection 23 and is connected to the column 15 as shown in Figs. 1 and 3. Thus it will be seen that the primary section of the lower trough member is fixedly supported in position, while the manner in which the rear end is curved around allows the stalks to be easily moved from engagement therewith, while the bent around portions will direct the ears of corn as hereinafter specified.

The auxiliary section 17 of the lower trough member is provided with an angular tip 26 which is secured as shown at 27 to the remaining member 11 adjacent the forward end thereof. The section 17 is also provided with a bar 28 which is fixed thereon in any desired manner and is provided with a clamp 29 at its rear end which engages with the remaining column 15 thus fixedly supporting the auxiliary section 17 in a desired position.

It will therefore be seen that the two sections 16 and 17 are efficiently supported in a trough like manner although the primary section 16 is longer than the auxiliary section and thus allows the stalks to be guided by the two sections properly in connection with the conventional form of corn binder.

The upper trough member comprises a pair of sections 30 having angular straps 31 fixed thereon, these straps also being secured to the member 10 to support the sections 30 upon the members 10 and directly above the lower trough member. These sections 30 are also provided with notches 32 intermediate their ends through which the standards 14 project, thus allowing the upper trough member to be efficiently supported above the lower trough member, while the notches not only allow the standards to extend therethrough and positively prevent displacement of the trough members intermediate their ends, but also allow the sections and trough members to be easily slipped into position upon a conventional form of corn binder without interference from the supporting means of such a structure.

After the corn stalks have been severed and are moving to a position where the same will be tied in bundles, the movement thereof will cause the ears of corn to be frequently broken from the stalks as above specified and because of the position of the trough members above described they will catch the falling ears. Of course the sections of each trough member are spaced apart and therefore will allow the stalks to pass therebetween, but as the ears strike the trough members, they will have a tendency to slide toward the lower portion thereof, owing to the downward and inwardly slanting arrangement of the sections of each trough member. As the stalks move toward the rear ends of the trough members, they will slide the ears of corn therewith whereupon the ears of corn of the upper trough member will fall downwardly toward the rear end of the lower trough member and then the ears will be directed around with the stalks past the bent rear end of the primary section of the lower trough member. It is known that the corn harvesters have receiving pans in which the bundles are tied and then the bundles are thrown onto a carrier and deposited where the same may be easily stacked or conveyed to places desired and obviously the ears of corn thus gathered by the trough members will be moved simultaneously with the movement of the bundles of bound corn stalks where the ears may be easily collected. Accordingly the arrangement of the trough members prevents the ears from falling downwardly into the machinery of the corn binder to fall under the corn binder and be crushed or to fall haphazardly over a field necessitating considerable work in the collection thereof.

It will be seen that the trough members are each formed of a pair of sections which are very simple in construction thus minimizing the cost of production thereof, while the construction is also of such nature as will allow the trough members to be inserted by an unskilled person in proper position upon a McCormick corn binder to catch the ears of corn and direct the same in the manner and for the purposes specified.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure by Letters Patent, is:—

1. In combination with a corn binder including superposed gathering boards arranged in pairs, standards bracing said gathering boards, an attachment consisting of a plurality of trough members situated on said gathering boards, each trough member consisting of a pair of sections converging toward their lower portions, said sections having notches therein intermediate their ends for receiving said standards for steadying said trough members intermediate their ends, and strap members connected to said trough members and to said gathering boards for holding said trough members in position.

2. In combination with a corn binder including superposed gathering boards arranged in pairs, standards bracing said gathering boards, an attachment comprising a trough member consisting of a primary section and auxiliary section formed of sheet material and converging adjacent their lower edges and situated on said gathering boards, the forward ends of said sections being provided with angularly extending flat tips adapted to be connected to a support, said trough members having notches intermediate their ends, one of said sections having an angular projection provided with a flange, said projection having a clamp thereon, and a bar carried by the remaining section having a clamp on its outer end, whereby said section may be connected to a portion of the binder for reinforcing the lower end of said section and one of said sections being longer than the remaining section to properly direct elements engaged thereby.

In testimony whereof I affix my signature in presence of two witnesses.

ADOLPH H. MEILICKE.

Witnesses:
F. E. LUMAN,
T. P. CASEY.